United States Patent
Olesen et al.

(10) Patent No.: US 11,510,488 B2
(45) Date of Patent: Nov. 29, 2022

(54) HEIGHT-ADJUSTABLE TABLE

(71) Applicant: LINAK A/S, Nordborg (DK)

(72) Inventors: Jais Lundahl Olesen, Aabenraa (DK); Alexander Møllenbach Nielsen, Haderslev (DK)

(73) Assignee: Linak A/S, Nordborg (DK)

( * ) Notice: Subject to any disclaimer, the term of this patent is extended or adjusted under 35 U.S.C. 154(b) by 189 days.

(21) Appl. No.: 16/499,548

(22) PCT Filed: May 15, 2018

(86) PCT No.: PCT/DK2018/000016
§ 371 (c)(1),
(2) Date: Sep. 30, 2019

(87) PCT Pub. No.: WO2018/210387
PCT Pub. Date: Nov. 22, 2018

(65) Prior Publication Data
US 2021/0100353 A1    Apr. 8, 2021

(30) Foreign Application Priority Data

May 15, 2017 (DK) .......................... PA 2017 00306
May 15, 2017 (DK) .......................... PA 2017 00307

(51) Int. Cl.
*G05B 19/045* (2006.01)
*A47B 9/20* (2006.01)
(Continued)

(52) U.S. Cl.
CPC .............. *A47B 9/20* (2013.01); *G05B 19/045* (2013.01); *G05B 19/19* (2013.01);
(Continued)

(58) Field of Classification Search
CPC .................. G05B 19/045; G05B 19/19; A47B 2200/0078; A47B 2220/0097
(Continued)

(56) References Cited

U.S. PATENT DOCUMENTS 3,080,835 A   3/1963 Guglielmi
3,839,614 A   10/1974 Saganowski et al.
(Continued)

FOREIGN PATENT DOCUMENTS

DE   196 04 329 A1   8/1997
DE   298 18 567 U1   1/1999
(Continued)

OTHER PUBLICATIONS

Robert O'Neill, "An Adjustable Workstation Computer Desk for People with Physical Disabilities", May 2003, OMI College of Applied Science University of Cincinnati, p. 1-86 (Year: 2003).*

*Primary Examiner* — Hien D Khuu
(74) *Attorney, Agent, or Firm* — Dykema Gossett PLLC

(57) ABSTRACT

The present invention relates to an improved height-adjustable table (1) which can assist and motivate the user to use the height-adjustable table in a manner which increases health, calorie burn and well-being. The table features a communication interface for connection of a user specific device providing the control with a set of user values for that specific guest user of the height-adjustable table in order to ease the configuration of the table to fit each individual user.

14 Claims, 3 Drawing Sheets

(51) Int. Cl.
*G05B 19/19* (2006.01)
*G05B 19/00* (2006.01)

(52) U.S. Cl.
CPC .............. *A47B 2200/0051* (2013.01); *A47B 2200/0056* (2013.01); *A47B 2200/0061* (2013.01); *A47B 2200/0062* (2013.01); *A47B 2220/0091* (2013.01); *G05B 19/00* (2013.01)

(58) Field of Classification Search
USPC ........................................................ 700/83
See application file for complete search history.

(56) References Cited

U.S. PATENT DOCUMENTS

| | | | |
|---|---|---|---|
| 5,050,941 | A | 9/1991 | Dahnert et al. |
| 5,323,695 | A | 6/1994 | Borgman et al. |
| 5,526,756 | A | 6/1996 | Watson |
| 5,556,163 | A * | 9/1996 | Rogers, III ............ A47C 1/023 297/362.11 |
| 5,588,377 | A | 12/1996 | Fahmian |
| 6,038,986 | A | 3/2000 | Ransil et al. |
| 6,360,675 | B1 | 3/2002 | Jones |
| 6,595,144 | B1 | 7/2003 | Doyle |
| 7,078,640 | B2 | 7/2006 | Miyake et al. |
| 9,486,070 | B2 | 11/2016 | Labrosse et al. |
| D794,581 | S | 8/2017 | Lin |
| D833,981 | S | 11/2018 | Seal et al. |
| 2005/0199520 | A1 | 9/2005 | Nielsen et al. |
| 2006/0061315 | A1 | 3/2006 | Schmidt et al. |
| 2008/0245279 | A1 * | 10/2008 | Pan .......................... A47B 9/00 108/144.11 |
| 2009/0078167 | A1 | 3/2009 | Ellegaard |
| 2009/0154079 | A1 * | 6/2009 | Bae ........................ A47B 21/00 361/679.02 |
| 2012/0126072 | A1 * | 5/2012 | Pettersson ................ A47B 9/04 248/157 |
| 2012/0241301 | A1 | 9/2012 | Chiba et al. |
| 2013/0199419 | A1 | 8/2013 | Hjelm |
| 2013/0204438 | A1 * | 8/2013 | Hjelm ....................... A47B 9/00 700/275 |
| 2014/0096706 | A1 | 4/2014 | Labrosse et al. |
| 2014/0109802 | A1 * | 4/2014 | Dienes ...................... A47B 9/00 108/50.11 |
| 2014/0137773 | A1 * | 5/2014 | Mandel ................ G06Q 10/109 108/50.11 |
| 2015/0047538 | A1 | 2/2015 | Ergun et al. |
| 2015/0120238 | A1 | 4/2015 | Marvit et al. |
| 2016/0106205 | A1 * | 4/2016 | Hall ....................... A47B 21/02 700/275 |
| 2016/0128467 | A1 | 5/2016 | Sigal et al. |
| 2016/0309889 | A1 * | 10/2016 | Lin ......................... A47B 9/00 |
| 2016/0353880 | A1 | 12/2016 | Sigal et al. |
| 2017/0055720 | A1 | 3/2017 | Lin et al. |
| 2017/0354244 | A1 | 12/2017 | Lee et al. |
| 2019/0223590 | A1 * | 7/2019 | Moore ...................... A47B 9/00 |
| 2019/0328128 | A1 * | 10/2019 | Namala .................... A47B 9/10 |
| 2021/0030146 | A1 * | 2/2021 | Riebner ................... A47B 9/00 |
| 2021/0112969 | A1 * | 4/2021 | Dhese ...................... A47B 9/00 |
| 2021/0386193 | A1 * | 12/2021 | Bucquet ................... A47B 9/00 |

FOREIGN PATENT DOCUMENTS

| | | | |
|---|---|---|---|
| DE | 102016115244 | A1 | 3/2017 |
| EP | 0922410 | A2 | 6/1999 |
| EP | 1470766 | A1 | 10/2004 |
| EP | 2141718 | A1 | 1/2010 |
| JP | 2003257287 | A | 9/2003 |
| JP | 2006155969 | A | 6/2006 |
| KR | 101453054 | * | 10/2014 |
| WO | 2003093619 | A1 | 11/2003 |
| WO | WO-03104941 | * | 12/2003 |
| WO | 2004040169 | A1 | 5/2004 |
| WO | WO 2007/102746 | * | 9/2007 |
| WO | 2009033486 | A1 | 3/2009 |
| WO | 2010054656 | A1 | 5/2010 |
| WO | 2017132240 | A1 | 8/2017 |

* cited by examiner

HEIGHT-ADJUSTABLE TABLE

CROSS-REFERENCE TO RELATED APPLICATIONS

This application is a national stage filing based upon international application no. PCT/DK2018/000016, filed 15 May 2018 (the '016 application), and published in English on 22 Nov. 2018 under international publication no. WO 2018/210387 A1, which claims priority to Denmark (DK) patent application no. PA 2017 00306, filed 15 May 2017 (the '306 application) and Denmark (DK) patent application no. PA 2017 00307, filed 15 May 2017 (the '307 application). The '306 application, the '307 application, and the '016 application all are hereby incorporated by reference as though fully set forth herein.

The present invention relates to a height-adjustable table and methods for operating such a table. Height-adjustable tables are also known as sit/stand desks.

A common height-adjustable table comprises a frame to which a table top is mounted. The frame is attached to one end of at least one linear actuator in the form of a lifting column. A foot is mounted to the other end of the lifting column. As examples of these types of lifting columns reference is made to WO/2004/040169 A1 and WO 2009/033486 A1 both LINAK A/S. The electrically driven lifting columns are connected to a control and an operating panel. These units are jointly denominated linear actuator systems.

Although height-adjustable tables comprising a linear actuator system are becoming more widespread, it is a fact that many users do not make use of its most obvious functionality, i.e. the height-adjustment. This is in contrast to the known benefits that movement during the day has for health, especially for our metabolism. Standing and moving burns more calories than sitting and engages the leg muscles of the user. Besides the higher calorie burn when standing it is also proven that standing and moving during the day improves circulation, energy, stress and overall well-being of the user. Just the act of going from a seated position to a standing position forces the body to work against gravity and helps strengthen our stabilizer muscles. In general, it is recommended that sedentary workers mix sitting and standing during an average workday—sitting or standing for no longer than one hour before changing position. A recommended goal is to strive for an extra 120 minutes of standing during a workday and to change postures at least 8 to 16 times.

Further, it has been recognized that the efficiency of the worker is enhanced if a standing position is taken.

Height-adjustable tables are especially appreciated in environments where multiple users time-share the same table or shift working place or table on a regularly basis. This can for example be the case in a call center with day shifts or where members of project teams sitting together are often shuffled in order to move resources in the company to the projects where the specific skills are needed at a specific time. The same time-share of adjustable tables could apply for gaming communities, public libraries or office space hotels, where it can be possible to rent an office table with or without computing facilities and pay on an hourly basis calculating the lapsed time of occupation of the facility.

The availability of a height-adjustable table benefits the individual users as it is possible to adjust the sitting and standing height level of the desktop to a level that comforts the user and is ergonomically correct for the user in order to prevent back and neck problems.

Having the possibility to adjust the height level of the table to the individual user is an advantage since the table is then usable for users with very different body shapes. As an example, a very tall person and a short person or a child can use the same table without any compromises in the height-adjustment setting since the table can be adjusted to each individual user.

However, it can be a challenge for the user to adjust a table to the perfect setting, which can lead to a situation where the table is misadjusted, which for the user can result in back, neck and head pains. Further, it is an annoying and time-consuming daily or recurrent task for the user to perform a careful height-adjustment of the table before a new working day or use session can be initiated.

A solution to the problem has been suggested by adding a memory for storing the "perfect" height-adjustment setting for the user which when selected can assist the user in resetting the table to the preferred and stored height-adjustment positions. However, even though this arrangement is beneficial for one user of a table it does not fully solve the problem since there, according to the previously mentioned scenarios of utility, might be more than one person, who on a daily or regularly basis utilizes the same table. Tables might be deployed on a first to occupy basis and thus not be reserved for use of any specific person.

It seems there is a need for a solution to the outlined problem of assisting a user of a height-adjustable table in achieving a perfect personal height adjustment setting of a table in one single action without the need for further minor adjustment actions.

More specifically, at least one, preferably more accurate and reproducible position settings should be obtainable for personal height adjusting of a table top, each setting representing a standing or sitting position in front of the table.

The objective of the invention is to provide an improved height-adjustable table, which can assist the user in adjusting the height-adjustable table to an accurate, reproducible preferred height.

According to the invention this is achieved by modifying the control to further comprise a communication interface for communicating with the control and a working memory associated with the control for storing a value representing a user setting with regard to a preferred height adjustment level setting, where the working memory in a first mode is being populated by default by the value stored in the programmable memory associated with the control or in a second mode is populated by a value communicated via the communication interface for communicating with the control.

More specifically, the invention concerns a height-adjustable table comprising: a linear electric actuator system, where the linear electric actuator system comprises: at least one linear actuator, a control, a system for determining the actual height adjustment level of the table providing information to the control, an operating unit with activation keys for user activated height adjustment of the table, a programmable memory associated with the control for storing at least one value representing a user setting with regard to a preferred height adjustment level setting, where the control further comprises: a communication interface for communicating with the control, a working memory associated with the control for storing a value representing a user setting with regard to a preferred height adjustment level setting, where the working memory in a first mode is being populated by default by the value stored in the programmable memory associated with the control or in a second mode is populated by a value communicated via the communication interface for communicating with the control.

As it can be seen, a user can apply personal information regarding preferred settings of a height-adjustable table top and utilize the personal settings by providing the settings available for the control via the communication interface.

More expediently, the communication interface is a connection for connecting a device that stores the user setting for an individual user to the control of a height-adjustable table and further makes the personal user settings available for use by the control for adjusting the height of the table top to exactly the preferred height of the user.

In an embodiment, the communication interface is a wired connection forming a plug or socket connection part. In other words, the control has a connection that is especially adapted for importing data regarding user settings which also counts stored values for sitting and standing height levels for the height-adjustable table.

In an embodiment, a device for connection with the wired connection is disclosed as a hardware dongle adapted to keep the value representing the user setting. The hardware dongle can easily be kept with the user in order to follow the user and serve to deliver the user specific settings to the control via the connection interface.

In specific embodiments, the dongle is a data carrier such as a memory stick or SD memory card, flash drive or the like, where the communication interface and the control are adapted to receive and utilize the data stored on the dongle.

In another embodiment, the communication interface is wireless for communicating with a mobile device, directly or indirectly via the internet. The user data for the individual user is stored on the mobile device and can be distributed from here to the control via the wireless connection interface.

In a further embodiment, the mobile device comprises a user interface for wireless access to the control and for providing an alternative user interface to the operating panel user interface.

In an appreciated embodiment, the mobile device is equipped with a user interface in the form of an app for storing user specific information and preferences such as sit/stand intervals for assisting the user and preferred sitting and standing height adjustment settings and exercise history. The settings can be downloaded from a control via the connection interface or can be typed directly into the app. When there is a need to utilize a table and apply the user specific preference settings stored in the app, the settings are simply uploaded to the control via the connection interface. Access to the data from other apps or mirroring or backing up the data might be offered and supported e.g. via the internet.

In an embodiment a pairing session of a table and a connected device will be performed before being subject to transfer of user specific information to the working memory of the control in order to personalize the table to the user at least as long as a connection via the communication interface is maintained.

Further, embodiments of the wireless interface include one of the following: Bluetooth, WIFI, ZigBee, GSM, EDGE, 3G, 4G, 5G or a proprietary protocol.

In yet another embodiment of the invention the height-adjustable table comprises a linear electric actuator system, where the linear electric actuator system further comprises at least one linear actuator, a control, a system for determining the actual height adjustment level of the table providing information to the control, an operating unit with activation keys for user activated height adjustment of the table, a programmable memory associated with the control for storing at least one value representing a user setting with regard to a preferred height adjustment level setting, where upon user activation of the activation keys the control continuously compares the information regarding the actual height adjustment level of the table with the value stored in the programmable memory and in the event that the values become equal or change dominance, respectively, the control interrupts the supply of power to the electric linear actuator in order to indicate to the user that the height-adjustment of the table has now reached a preferred height setting as indicated by the user setting stored in the programmable memory.

Further, the control is configured to react when the activation key upon user activation is being kept continuously activated during the interruption of the supply of power to the electric linear actuator, such as to reconnect the supply to the electric linear actuator again after elapse of a delay time defined by a setting in the control. The delay time value is programmable in the range between 0.1 to 5 seconds, with a preferred value of 1 second.

Further, the control is configured to react when the activation key upon user activation is released and activated again during the interruption of the supply of power to the electric linear actuator where the supply to the electric linear actuator will be connected again without any delay.

Further, the control is configured to upon user activation, performing a double tab of the activation key, and releasing the activation key, to perceive this as a signal for providing power to the electric linear actuator until a memory position has been reached where the control automatically will disconnect the power to the electric linear actuator, and the control will be waiting for further user activation before providing electrical power to the electric linear actuator.

The action requested by a double tab activation of the activation keys can be reset by performing a third activation of an activation key which by the control will be perceived as a request to disconnecting the power to the electric linear actuator.

An embodiment of the invention will be described more fully below with reference to the accompanying drawing, in which.

Figure 1:
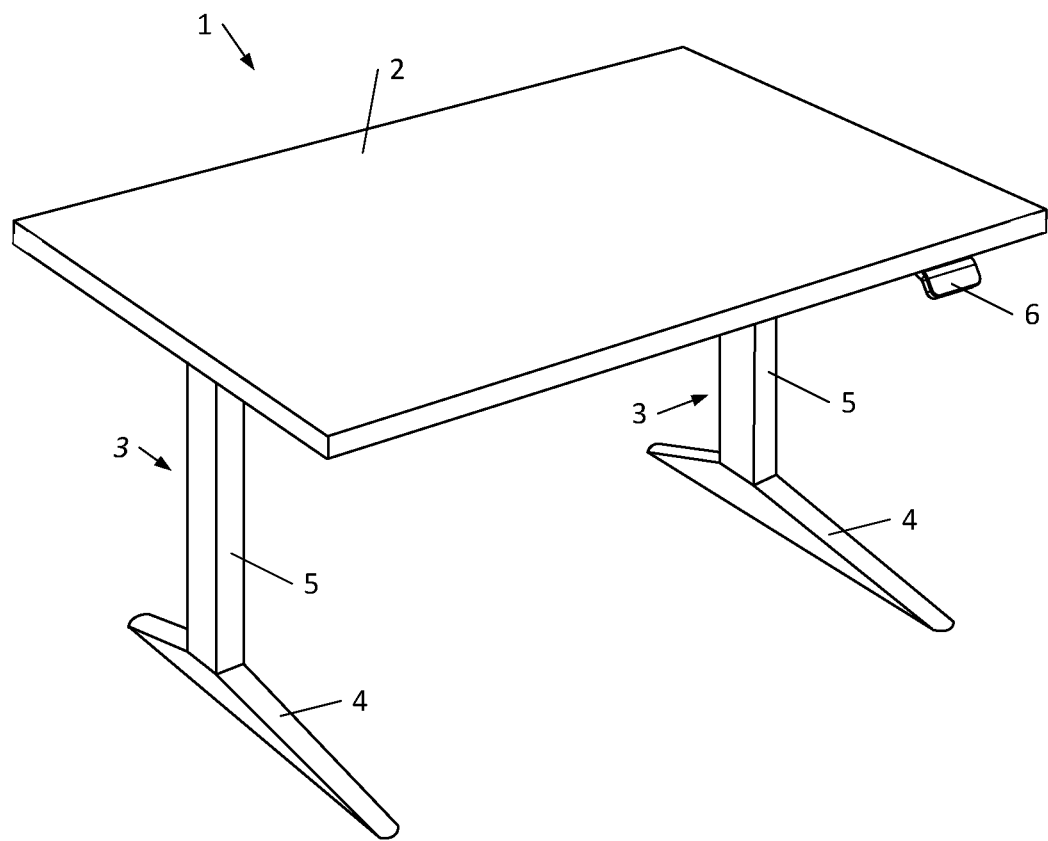
FIG. 1 shows a perspective view of a height-adjustable table.

FIG. 1 shows a perspective view of a height-adjustable table 1 comprising a table top 2. At each side of the height-adjustable table 1 a linear actuator in the form of a lifting column 3 is mounted in a carrying frame (not shown) onto which the table top 2 is mounted. The other end of each lifting column 3 comprises a foot 4 on which the height adjustable-table 1 stands. The lifting columns comprise a drive unit (not shown) and two or three mutually telescopically arranged profiles. One profile 5 is stationary fixed to the foot 4 and one profile (not referenced) is stationary fixed to the motor housing. Each lifting column 3 is driven by means of an electric motor, which through a gear drives a spindle. The spindle is furnished with a spindle nut secured to the telescopically movable profile(s). The height-adjustment of the table top 2 is thus performed by the lifting columns 3. The adjustment is achieved by activating the operating panel 6.

Figure 2:
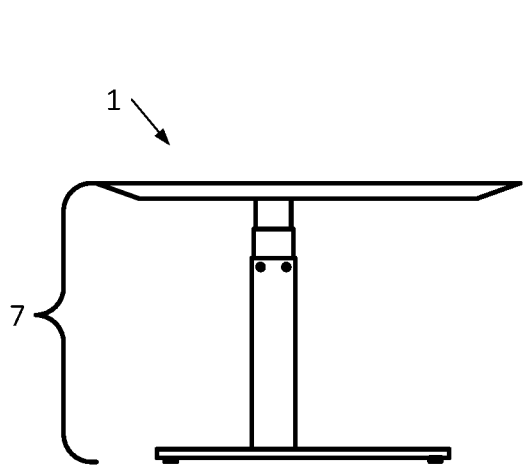
FIG. 2 illustrates a height-adjustable table in a sitting position.
Figure 3:
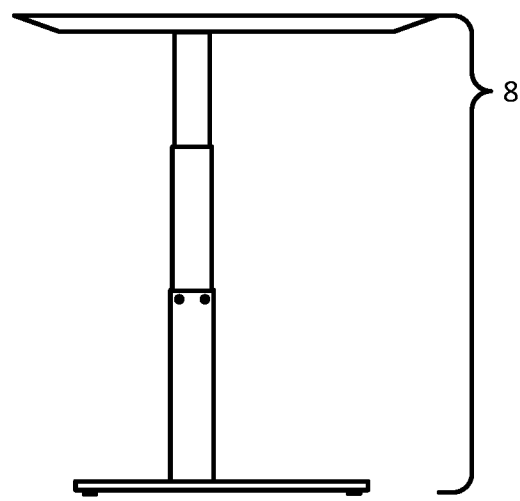
FIG. 3 illustrates the height-adjustable table in a standing position.

FIGS. 2 and 3 illustrate a side view of the height-adjustable table 1 in a sitting position 7 and a standing position 8, respectively. Since the length of the lifting columns 3 can be adjusted, the sitting position 7 and standing position 8 can be set to accommodate the physical characteristics and personal preferences of each individual user of the height-adjustable table 1.

Figure 4:
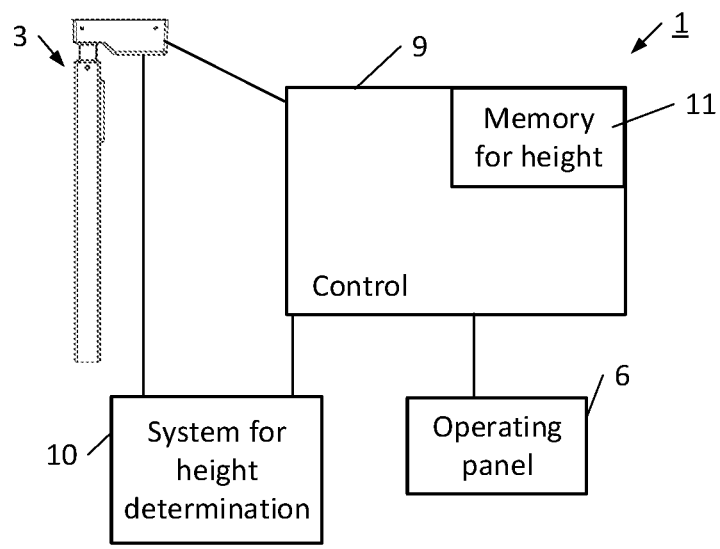
FIG. 4 is a schematic diagram of the height-adjustable table.

FIG. 4 depicts a schematic view of the height-adjustable table 1 comprising a linear actuator 3, a controller 9, a system 10 for determining the actual height adjustment level of the height-adjustable table 1, and an operating panel 6.

The system 10 for determining the actual height adjustment level could be determined by potentiometers or Hall sensors built into the linear actuators 3 or by other detection means such as an optical sensor. The system 10 for determining the actual height adjustment level provides input information about the actual height adjustment level to the controller 9.

The operating panel 6 is connected to the controller 9 for user activation requesting an adjustment of the height level of the height adjustable table 1 by supplying the at least one linear actuator 3 from an appropriate source of electrical energy (not shown).

Figure 5:
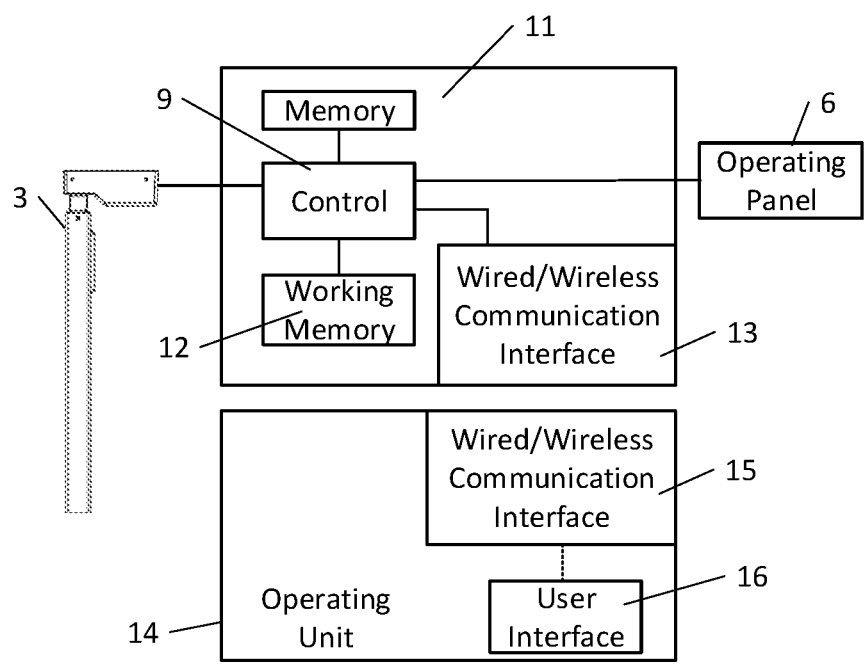
FIG. 5 is a schematic diagram of the height-adjustable table having a communication interface for connecting an external unit and FIG. 6 is a perspective view of the operating panel.
Figure 6:
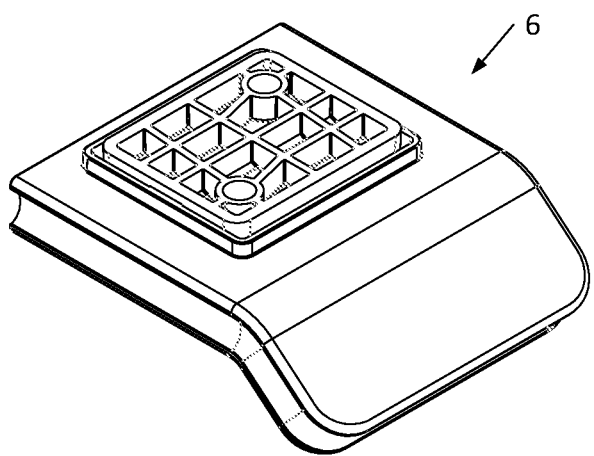

The controller 9 comprises a memory 11 for storing at least one height adjustment setting 7,8 referring to a sitting position 7 or a standing position 8. As shown in FIG. 5 the control 9 can be operated directly by activation of an operating panel 6. An example of an operating panel 6 is shown in FIG. 6. More expediently, the operating panel 6 is operated by tilting. Tilting and holding the operating panel 6 up will drive the height adjustable table 1 upwards. Likewise pressing and holding the operating panel 6 up will drive the height adjustable table 1 downwards. When the operating panel 6 is released the height adjustable table 1 stops in the requested position.

Via the operating panel 6 it is possible to store a height adjustment setting 7,8 referring to a sitting position 7 or a standing position 8.

After storing the memory positions, the positions can be reached simply by tilting the operating panel 6. When a stored position is reached, the height adjustable table 1 stops. In this way the user can easily change between sitting position 7 and standing position 8 without looking at the operating panel 6 in the meantime.

The operating panel 6 will stop at all stored memory positions during the stroke length of the height-adjustable table 1. When the height-adjustable table 1 stops at a memory position, the user can continue to tilt the operating panel 6 for e.g. 1 second and the height-adjustable table 1 will move past the memory position and continue in the direction of the tilt. Furthermore, when the height-adjustable table 1 stops at a memory position, the user can release the operating panel 6 and tilt again immediately to move past a memory position.

The stored memory positions can also be reached by a double tab of the operating panel 6 whereby the height-adjustable table 1 adjusts automatically to the first memory position in the direction of the double tap. Tab the operating panel 6 again and the height adjustable table 1 will stop.

A memorized height adjustment setting is stored in the memory arranged with the control 9. By default, this memory setting is copied to a working memory, which serves to preserve the setting stored in the memory arranged with the control unchanged. Thus, the control will use the setting in the working memory for determining the memorized height adjustment settings. In the event that a guest user wants to utilize the table, the user can connect his own personal device to the control via the wired/wireless communication interface. When a device is connected, the user settings stored in that personal device will be forwarded to the control via the wired/wireless communication interface and overwrite the settings in the working memory. Please note that the settings stored in the memory arranged with the control will not be influenced but remain the default setting values when no personal device is connected to the control via the wired/wireless interface.

For connecting to the control via the communication interface various devices can be foreseen. In a simple embodiment the device is a wired dongle with a memory that can be utilized by the control 9 for taking in user settings stored in the dongle. More sophisticated devices, wired or wireless, can be operating panels connectable via the communication interface for providing a user interface and keeping the user settings for the specific user in a memory that can be communicated to the control 9 and used in the working memory. A further embodiment can be an app on a wireless device such as e.g. a tablet or a mobile handset which keeps the personal user data and when connected to the control via the communication interface communicates the user settings to the control for use in the working memory.

As it should now be fully demonstrated it is possible to carry personal user data with regard to at least user settings for a preferred standing and sitting position used for a height-adjustable table top and when occupying a table transfer the personal user settings in order to configure the table for use as if it was a personal table, and when leaving the table disconnecting the communication interface again leaving the table as before with the originally stored preference settings of a frequent or daily user. Thus, the height-adjustable table can in an easy way adapt to a guest user's needs without any risk of health hazards relating to misalignment of the sitting or standing height adjustment level of the table.

The invention claimed is:
1. A height-adjustable table (1) comprising:
a linear electric actuator system, where the linear electric actuator system comprises:
at least one linear actuator (3),
a control (9),
a system for determining the actual height adjustment level of the table providing information to the control,
an operating unit (6) with activation keys for user activated height adjustment of the table,
a programmable memory associated with the control for storing at least one value representing a user setting with regard to a preferred height adjustment level setting for a frequent user,
a communication interface for connecting a personal device that stores a user setting for a guest user to the control, and
a working memory associated with the control for storing a value representing a user setting with regard to a preferred height adjustment level setting,
wherein the control is configured to adjust the height of the table according to the value stored in the working memory,
said working memory in a first mode being populated by default by the value stored in the programmable memory associated with the control when no personal device is connected to the control via the communication interface and in a second mode being populated by a value communicated via the communication interface for communicating with the control when a personal device is connected to the control via the communication interface;

wherein upon user activation of the activation keys, the control continuously compares the information regarding the actual height adjustment level of the table with the value stored in the programmable memory and in the event that the value of the actual height adjustment level of the table becomes equal to or changes dominance with the value stored in the programmable memory, the control interrupts a supply of power to the electric linear actuator in order to indicate to the user that the height-adjustment of the table has now reached a preferred height setting as indicated by the user setting stored in the programmable memory.

2. The height-adjustable table according to claim 1, where the communication interface is a wired connection forming a plug or socket connection part.

3. The height-adjustable table according to claim 2, where the device for connection with the wired connection is a hardware dongle adapted to keep the value representing the user setting.

4. The height-adjustable table according to claim 3, where the dongle is a data carrier such as a memory stick or SD memory card, flash drive or the like and that the communication interface and the control is adapted to receive and utilize the data stored on the dongle.

5. The height-adjustable table according to claim 1, where the communication interface is wireless for communicating with a mobile device, directly or indirectly via a network, wherein user data for the individual user is stored and can be distributed from the mobile device.

6. The height-adjustable table according to claim 5, where the mobile device is a user interface for wireless accessing of the control and providing an alternative user interface to the operating unit.

7. The height-adjustable table according to claim 5, where the mobile device is equipped with a user interface in the form of an app for storing user specific information and preferences such as sit/stand intervals for assisting the user and preferred sitting and standing height adjustment settings and exercise history.

8. The height-adjustable table according to claim 1 where a pairing session of the table and a connected device is subject to transfer of user specific information to the working memory of the control in order to personalize the table to the user as long as a connection via the communication interface is maintained.

9. The height-adjustable table according to claim 5, where the wireless interface includes one of the following: Bluetooth, WIFI, ZigBee, GSM, EDGE, 3G, 4G, 5G or a proprietary protocol.

10. The height-adjustable table (1) according to claim 1, wherein when the activation key upon user activation is being kept continuously activated when the control interrupts the supply of power to the electric linear actuator, the supply to the electric linear actuator will be connected again after elapse of a delay time defined by a setting in the control.

11. The height-adjustable table (1) according to claim 1, wherein when the activation key upon user activation is released and activated again when the control interrupts the supply of power to the electric linear actuator, the supply to the electric linear actuator will be connected again without any delay.

12. The height-adjustable table (1) according to claim 1, wherein upon user activation, performing a double tab of the activation key, and releasing the activation key, the control will perceive this as a signal for providing power to the electric linear actuator until a memory position has been reached where the control will disconnect the power to the electric linear actuator, and the control will be waiting for further user activation before providing electrical power to the electric linear actuator.

13. The height-adjustable table (1) according to claim 12, wherein a double tab activation of the activation keys can be reset by performing a third activation of an activation key which by the control will be perceived as a request to disconnecting the power to the electric linear actuator.

14. The height-adjustable table (1) according to claim 10, wherein the delay time value is in the range between 0.1 to 5 seconds, with a preferred value of 1 second.

* * * * *